US006839020B2

(12) United States Patent
Geier et al.

(10) Patent No.: US 6,839,020 B2
(45) Date of Patent: Jan. 4, 2005

(54) AIDING LOCATION DETERMINATIONS IN SATELLITE POSITIONING SYSTEM RECEIVERS

(75) Inventors: George J. Geier, Scottsdale, AZ (US); William P. Declerck, Palatine, IL (US); Thomas M. King, Tempe, AZ (US); James Edward Stephen, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/452,735

(22) Filed: Jun. 2, 2003

(65) Prior Publication Data

US 2004/0239558 A1 Dec. 2, 2004

(51) Int. Cl.[7] .................................................. G01S 5/14
(52) U.S. Cl. ............................ 342/357.02; 342/357.1
(58) Field of Search ........................ 342/357.02, 357.1, 342/357.09

(56) References Cited

U.S. PATENT DOCUMENTS

| 5,311,195 | A | * | 5/1994 | Mathis et al. ............ 342/357.14 |
| 5,982,324 | A | | 11/1999 | Watters et al. |
| 5,999,124 | A | | 12/1999 | Sheynblat |
| 5,999,126 | A | * | 12/1999 | Ito ............................. 342/357.1 |
| 6,377,891 | B1 | * | 4/2002 | Gilbert .......................... 701/213 |
| 6,420,999 | B1 | * | 7/2002 | Vayanos ................. 342/357.03 |
| 6,462,706 | B2 | * | 10/2002 | Decker .................... 342/357.02 |
| 2001/0024172 | A1 | * | 9/2001 | Ito et al. ................. 342/357.02 |
| 2002/0107636 | A1 | * | 8/2002 | Ford et al. .................... 701/213 |
| 2003/0043069 | A1 | * | 3/2003 | Shamoto et al. .......... 342/357.1 |
| 2003/0125045 | A1 | * | 7/2003 | Riley et al. .................. 455/456 |

FOREIGN PATENT DOCUMENTS

| EP | 000518146 A2 | * | 12/1992 | ............ G01S/5/14 |
| WO | WO 01/58194 A1 | * | 8/2001 | ............ H04Q/7/36 |

OTHER PUBLICATIONS

Soliman, Samir et al, "gpsOne: A Hybrid Position Location System" IEEE, 2000, pp. 330–335.*
3GPP TS 04.35 V8.4.0 (Dec. 2001) Technical Report, 3RD Generation Partnership Project; Technical Specification Group GSM EDGE Radio Access Network; Location Services (LCS); Broadcast Network Assistance for Enhanced Observed Time Difference (E–OTD) and Global Positioning System (GPS) Positioning Methods (Release 1999), Global System for Mobile Communications, 35 pages.
Kaplan, E., "Understanding GPS: Principles and Applications", ArTech House, 1996, 9 pages.

* cited by examiner

Primary Examiner—Gregory C. Issing
(74) Attorney, Agent, or Firm—Roland K. Bowler, II

(57) ABSTRACT

A method for locating a satellite positioning system receiver, for example, a satellite positioning system enabled wireless communications device in cellular network, including obtaining a coarse position and/or a time estimate (210), and computing a satellite positioning system based position and/or time solution (240) that is constrained by uncertainty information associated with the coarse position and/or a time estimate. The uncertainty constraints may also be used to identify erroneous measurements used to compute the position solution.

18 Claims, 5 Drawing Sheets

US 6,839,020 B2

AIDING LOCATION DETERMINATIONS IN SATELLITE POSITIONING SYSTEM RECEIVERS

FIELD OF THE DISCLOSURE

The present disclosure relates generally to locating wireless receivers, and more particularly to constraining satellite positioning system based location determinations using uncertainty information, for example, coarse location and/or coarse time uncertainty information in satellite positioning system enabled wireless communications devices, and methods therefor.

BACKGROUND OF THE DISCLOSURE

The use of Global Positioning System (GPS) based location determinations in cellular telephone handsets to satisfy the E-911 location requirement mandated by the Federal Communications Commission (FCC) and to support value-added commercial applications requires that the GPS receiver embedded in the cellular handset acquire a minimum of numbers GPS satellites having an acceptable geometrical configuration. If altitude is known reasonably accurately, the GPS receiver may compute its location upon acquiring at least threes satellites, otherwise at least four satellites must be acquired. Acquisition of three or four satellites however may not always be possible, for example, when attempting to determine location from inside buildings and in other areas where satellite signal strength is attenuated. Even where satellite signal strength is not an issue, poor satellite geometry may produce excessive position error.

Enhanced Observed Time Difference (E-OTD) is an alternate means of determining the location of a wireless handset based upon Time-Of-Arrival (TOA) information obtained by the wireless handset and communicated to cellular network infrastructure where the handset location is computed with the benefit of Location Measurement Unit (LMU) determined correction information. The position computation accuracy of E-OTD location technology however is often less than the accuracy requirements imposed by the FCC for E-911 compliance. The inaccuracies of E-OTD location computations are attributed largely to its relatively poor measurement quality and to its susceptibility to signal multi-path interference.

It is known to aid GPS based positioning determinations with Time of Arrival (TOA) measurements in cellular communications networks. U.S. Pat. No. 5,999,124 entitled "Satellite Position System Augmentation With Wireless Communication Signals", for example, teaches the fusion of Time of Arrival measurements with GPS pseudo range information in the measurement domain.

It is also known generally to provide coarse location and corresponding coarse location uncertainty information to a GPS receiver for reducing the code phase search space and for determining whether the coarse location is suitable for linearizing GPS pseudo range measurements.

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
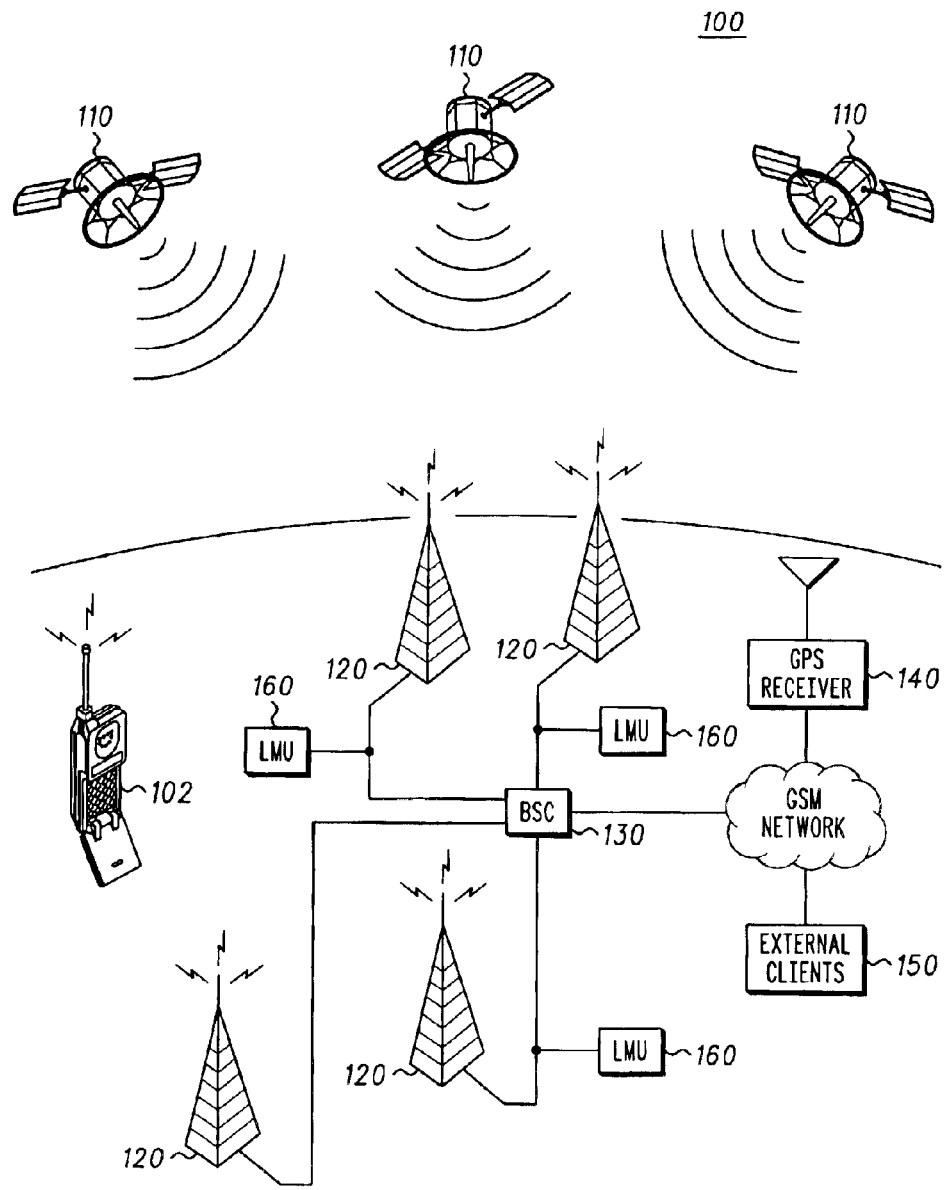
FIG. 1 is an exemplary wireless communications network having a satellite positioning system enabled mobile communications handset.

FIG. 1 illustrates an exemplary wireless communications network in the form of a Global System for Mobile communications (GSM) network 100 that provides wireless communications for GSM mobile wireless communication devices, for example, mobile station (MS) 102, also referred to herein as mobile wireless communications devices or as user equipment. The mobile wireless communication devices may be wireless cellular telephones, or two-way pagers, or wireless enabled personal digital assistants (PDAs) or notebook or laptop computers, or other radio communications devices, anyone of which may be a cellular communications service subscriber device or subscriber terminal.

According to one aspect of the disclosure, the mobile station 102 is a satellite receiver equipped mobile station, for example, a satellite positioning system (SPS) enabled mobile station or a satellite transceiver enabled mobile station. FIG. 1 illustrates a plurality of satellites 110, which may constitute part of an earth-orbiting satellite positioning system, for example, the NAVSTAR Global Positioning System or the European satellite positioning system Galileo, that transmit navigation signals for reception by SPS enabled receivers. Alternatively, the satellites may be that of a constellation of communications satellites, which communicate with satellite transceiver equipped mobile stations.

The exemplary GSM communications network 100 comprises generally a plurality of base-station transceivers 120 that communicate with a base station controller (BSC) 130. The exemplary GSM network also includes one or more satellite positioning system receivers, for example, GPS receiver 140. GSM communications network architectures also include generally other entities that are well known but not illustrated in FIG. 1, including a Serving Mobile Location Center (SMLC), a Mobile Switching Center/Visitor Location Register (MSC/LVR), a Home Location Register (HLR), a Cell Broadcast Controller (CBC). The communications network 100 is also coupled to external clients 150, including Location Services (LCS) Clients, e.g., E-911 operators, among other clients, and to gateways to other networks and Public Land Mobile Networks (PLMNs).

The exemplary GSM network 100 includes a plurality Location Measurement Units (LMUs) 160, which may be co-located at the base station transceivers or at other locations in the network. In the exemplary network, the LMUs support Enhanced Observed Time Difference (E-OTD) Location Services (LCS) and possibly other location technologies. Other networks do not include LMUs, and LMUs are not required for all embodiments of the disclosure.

Generally, Location Services (LCS) architectures may compute location at either the network or at the mobile station. In MS-assisted LCS architectures, location is determined at the network with information received from the mobile station. In MS-based LCS architectures, location is computed at the mobile station, with or without information received from the network.

In the exemplary E-OTD location architecture, an E-OTD based mobile station location fix may be computed at the network, for example, at the SMLC, with timing measurements from the mobile station and with timing measurements from the LMUs. Alternatively, an E-OTD based location fix may be computed by or at the mobile station with measurement information from the LMUs. Similarly, satellite positioning system based location computations may be performed either at the network with pseudo range or other information provided by the mobile station. Alternatively, satellite positioning system based location computations may be performed at the mobile station, with or without information from the network.

GSM 04.35, Broadcast Network Assistance For E-OTD and Global Positioning System (GPS) Methods specifies the broadcast of E-OTD and GPS Assistance Data in an SMS Cell Broadcast (SMSBC) message. The E-OTD Assistance data includes base station coordinate information, and the GPS assistance data includes GPS Differential Correction data for computing location at the subscriber device using E-OTD and GPS technologies, respectively. The present disclosure is not to be constrained by these and other communications standards.

The GSM communications network architecture of FIG. 1 is only exemplary and not intended to limit the invention. The inventions apply more generally to all communications networks that provide or support location services, including, for example, 3rd Generation (3G) Universal Terrestrial Radio Access Network (UTRAN), 4th Generation communications networks and among other existing and future communications network and systems. These and other networks may support E-OTD or other location services including, for example, Global Positioning System (GPS) and other satellite positioning system location services, as well network based location services, for example, Time of Arrival (TOA), Time Difference of Arrival (TDOA) among other location determination schemes, including fused location schemes, or combinations thereof. Thus the LMUs in FIG. 1 may not exist in networks that do not support E-OTD or other location services that require LMUs.

Figure 2:
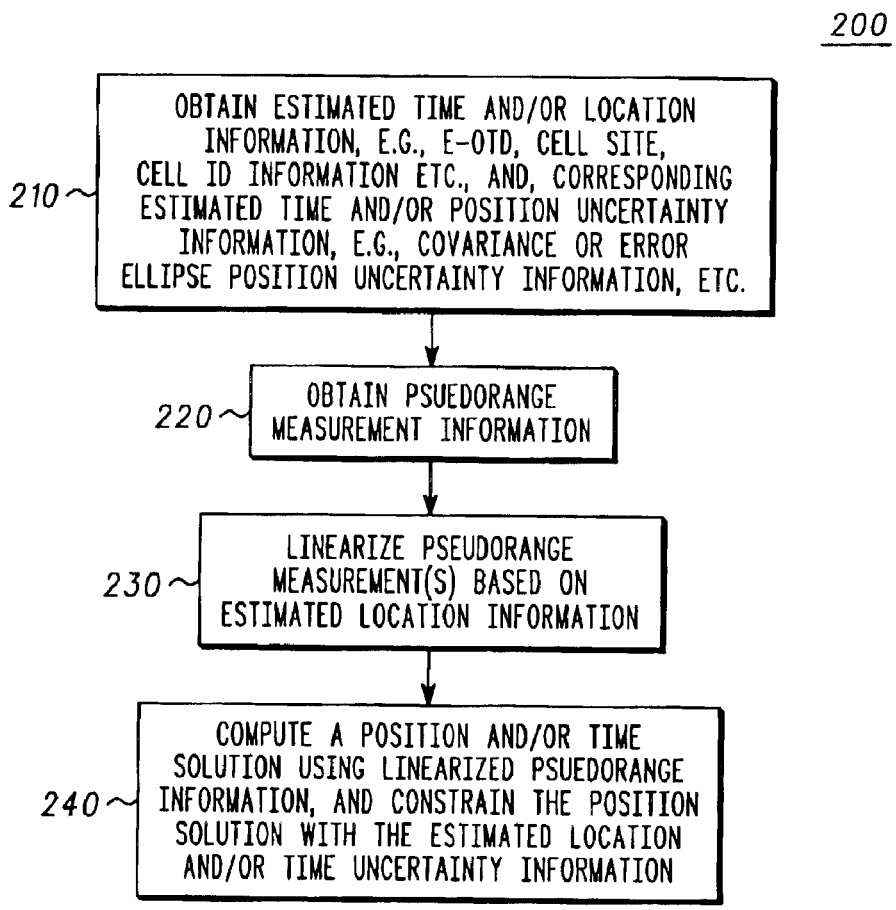
FIG. 2 is an exemplary process flow diagram for constraining a position solution using estimated location uncertainty information.
Figure 4:
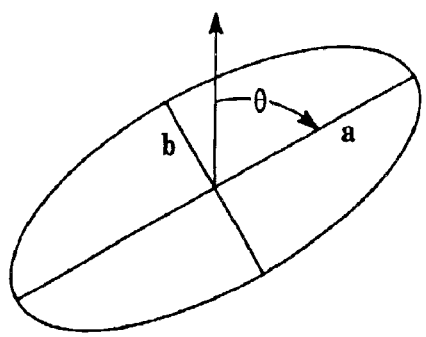
FIG. 4 illustrates the relationship between an error ellipse and navigation coordinates.

In the process-flow diagram 200 of FIG. 2, at block 210 the mobile station obtains a coarse estimate of its location. The accuracy or uncertainty of the mobile station's course location or position estimate is preferably sufficient to guarantee convergence of an satellite positioning system location solution, as discussed more fully below. An accuracy of approximately 10 km is generally adequate for this purpose.

The mobile station may obtain its coarse location estimate from an external source, for example, from a wireless communications network. Alternatively, the estimated location of the mobile station may be computed by or at the mobile station. The coarse location information may be in 2 or 3 dimensions, for example, latitude/longitude coordinates with or without elevation information. In other embodiments, the coarse location estimate may be in some other coordinate system.

In one embodiment, the coarse position estimate of the mobile station is provided with or as part of GPS assistance information sent by a communications network to the mobile station, for example, over a cellular communications interface. In another embodiment, the coarse location estimate is an Enhanced Observed Time Difference (E-OTD) based location fix computed either at the network or by the mobile station. In another embodiment, the mobile station coarse location estimate may be based on the location of a base-station transceiver serving-cell, which may have an expected accuracy of approximately 10–20 kilometers. In another embodiment, the mobile station coarse location estimate is based upon coordinates of the geometric center of the serving cell, the expected accuracy of which may be approximately 1–5 kilometers. In yet another embodiment, a coarse location estimate may be determined by integrating serving cell identification with coarse ranging information, the expected accuracy of which is approximately 1–2 kilometers. More generally, the estimated location of the mobile station may be obtained from any source, including latitude and longitude coordinates or other information provided by an application running on the mobile station or input by the user.

In FIG. 2, at block 220, the mobile station obtains one or more pseudo range measurements by measuring corresponding signals from corresponding satellites of a satellite positioning system, for example, satellites in the NAVSTAR GPS constellation. The coarse position estimate in combination with ephemeris data, which may be obtained via an assistance message or directly from the satellites, may be used to predict satellite Doppler information, which may be used to reduce the GPS signal search space, thereby expediting the acquisition of satellite signals. Predicting satellite Doppler information based on coarse location suggests that coarse location is obtained prior to obtaining the pseudo range information. Alternatively, the acquisition of coarse location information and pseudo range measurements, in blocks 210 and 220, may occur concurrently or in reverse order, for example, in applications where coarse location is not required for Doppler information prediction.

At block 230, the one or more pseudo range measurements are linearized based on the coarse location estimate of the mobile station before computing a positioning solution. The linearization of satellite pseudo range measurements based upon a coarse location estimate is known generally by those having ordinary skill in the art and is not discussed further herein.

In FIG. 2, at block 240, the one or more linearized pseudo range measurements are used to compute a Least Squares (LS) position solution, or a Weighted Least Squares (WLS) position solution, or a Recursive Least Squares (RLS) position solution, or a graphical position solution or a Kalman filter based position solution, or some other iterative position solution for the mobile station. These and other position solution computations using pseudo range or linearized pseudo range information are generally well known by those having ordinary skill in the art. In one embodiment, the position solution is computed at the mobile station, and in other embodiments the position solution is computed external to the mobile station, for example, at a location server in communication with a communications network, for example, at the GSM network in FIG. 1.

In FIG. 2, at block 210, in some embodiments, the mobile station obtains uncertainty information for, or corresponding to, its coarse location estimate. The coarse location uncertainty may be 2 or 3 dimensional information. In one embodiment, for example, the uncertainty information is covariance information, and in another embodiment the uncertainty information is error ellipse information, although in other embodiments the coarse location uncertainty may be in other forms as well.

If the mobile station can obtain timing information of sufficient accuracy, the coarse position together with the timing information can be used to predict the phase of the pseudorandom modulation of the satellite signal. The coarse position accuracy, or uncertainty, may be used to narrow the range of the code phase search space during signal acquisition. In GPS, there are 1023 code phase chips per millisecond and the code phases repeat every millisecond, wherein each chip corresponds to roughly 300 meters of position error along a line-of-sight to the satellite being acquired. Thus, for example, if the error in the supplied coarse position estimate is less than 10 km, corresponding roughly to 33 chips of uncertainty, the code phase search range could be reduced significantly relative to a full code phase search, i.e., a reduction from 1023 chips to 33 chips. In order to exploit this advantage, time must be known with comparable accuracy, for example, to 33 chips of uncertainty, which corresponds roughly to 33 microseconds of timing error.

Using conventional nomenclature associated with a WLS position solution, as discussed for example in E. Kaplan, "Understanding GPS: Principles And Applications", Artech House, 1996, the position correction vector is given by:

$$\delta p = H'r = (H^T R^{-1} H)^{-1} H^T R^{-1} r \quad (1)$$

In Equation (1), the "H" matrix represents the relationship between pseudo range measurements and estimated corrections, which may include altitude and clock corrections, and horizontal position corrections. The "R" matrix represents an expected accuracy of the pseudo range measurements, for example, the variance of the pseudo range measurement error. "H'" denotes the pseudo or generalized inverse matrix, "r" is the vector of linearized pseudorange measurements, the "T" superscript denotes the matrix transpose operation, and the "−1" superscript denotes the matrix inverse operation.

For linearized pseudorange measurements, each row of the "H" matrix is given by the following well-known relation:

$$h^T = [u^T 1] \quad (2)$$

In Equation (2) the vector "u" represents the unit line-of-sight vector (in geographical or navigational coordinates) to the satellite whose pseudo range measurement corresponds to the corresponding row of the "H" matrix. The diagonal element of the "R" matrix, corresponding to the row of the "H" matrix given by Equation (2), corresponds to the expected accuracy of the linearized pseudo range measurement (expressed in the form of an error variance) corresponding to the satellite whose line-of-sight vector is referenced in Equation (2). For example, if the second row of the "H" matrix corresponds to a GPS satellite whose PRN number is 24, then the unit line-of-sight vector "u" in Equation (2) represents the line-of-sight to satellite 24, and the second diagonal element of the "R" matrix represents the error variance assigned to the linearized pseudo range measurement determined for satellite 24.

Figure 3:
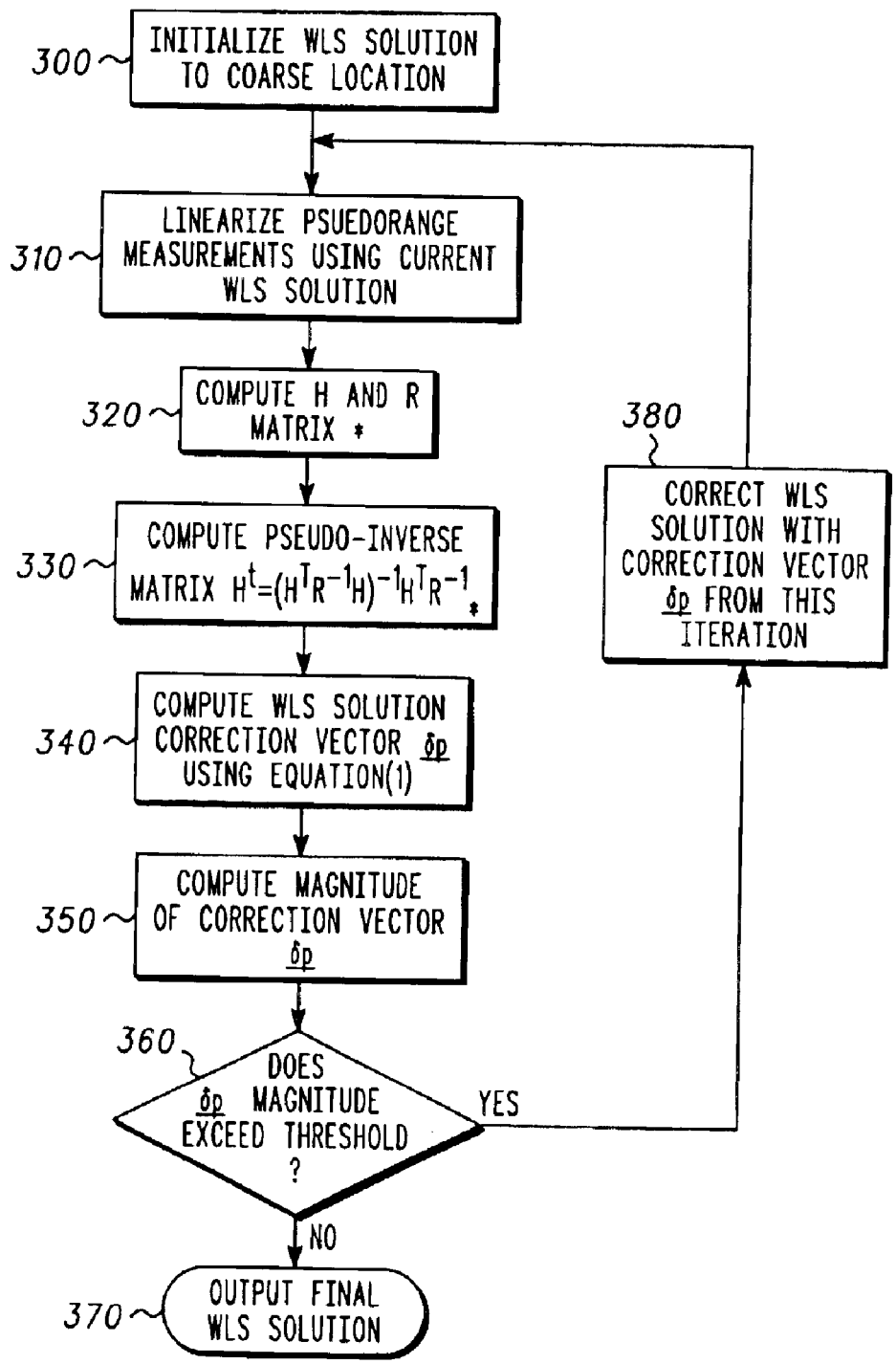
FIG. 3 is an exemplary process flow diagram illustrating a Weighted Least Squares (WLS) position solution.

FIG. 3 illustrates generally the process for computing a WLS position solution. FIG. 3 is more generally illustrative of some other iterative algorithm that computes a position solution. Pseudo range measurements, for example, satellite positioning system pseudo range measurements or other pseudo range measurements made relative to ground stations are obtained prior to calculation of the position solution. At block 300, the process begins by initializing the position solution to the coarse location prior to executing the iterative algorithm.

At block 310, the pseudo range measurements are linearized by subtracting an estimated range to each satellite (determined, as is known in the art, from the current WLS estimated location) and an estimate of the satellite's position to form the vector "r" in Equation (1). In other embodiments, however, the position solution is computed using non-linear equations. Thus in some embodiments it is not necessary to linearize the pseudo range measurements.

At block 320, the "H" and "R" matrices of Equation (1) are determined by construction of the pseudo or generalized inverse matrix at block 330. In one embodiment, the operations or acts performed at blocks 320 and 330 in FIG. 3 are repeated iteratively, although in other embodiments it is acceptable to perform the operations in a single step.

In FIG. 3, at block 340, a correction vector, δp, is determined using Equation (1). Before the correction vector is used to refine the position solution at block 380, its magnitude is calculated at block 350 and the magnitude of the correction vector is compared with a pre-determined threshold at block 360. The pre-determined threshold is established based upon the desired accuracy of the position solution. If the magnitude of the correction vector does not exceed the threshold, it is not necessary to correct the position solution of the present iteration with the correction vector, δp, and the output of the iteration is the final solution, as indicated at block 370.

If the correction vector magnitude exceeds the pre-determined threshold at block 360, the correction vector is used to correct the current position solution iteration at block 380, and the iterations continue until the condition is satisfied at block 360.

In FIG. 3, as noted, the coarse location estimate is used as a starting point for the iterative position solution. If the coarse location estimate is sufficiently accurate, the position solution computation and more particularly the horizontal position corrections thereof, may be constrained within the accuracies of the estimated location uncertainty.

In one embodiment, the one or more pseudo range measurements used in the iterative solution are augmented by the following horizontal position correction constraints:

$$\delta p_e = 0 \quad (3)$$

$$\delta p_n = 0 \quad (4)$$

In Equations (3) and (4), "$\delta p_e$" is the position correction constraint component in the East direction, and "$\delta p_n$" is the position correction constraint component in the North direction. Exemplary Equations (3) and (4) constrain the magnitude of the horizontal corrections to the coarse position in the iterative position solution, subject to the accuracy or uncertainty of the coarse position estimate. The uncertainty in the estimated position may be provided, for example, by covariance or error ellipse information or by some other boundary on the accuracy of the estimated position, etc. Equations (3) and (4) are readily implemented with the linearized pseudorange measurements in a position solution, for example, in the WLS algorithm of FIG. 3, if Equations (3) and (4) are independent.

According to the disclosure, the "R" matrix also represents the expected accuracy of the estimated position components, for example, the variance of the horizontal position correction components. In one embodiment, the variance of the horizontal position correction components is based upon covariance information or error ellipse information or some other coarse or estimated position uncertainty information. The "R" matrix is diagonal as long as the measurement errors of the linearized pseudo range measurements and estimated position components are independent. GPS linearized pseudo range measurements are generally independent.

If the coarse location estimate uncertainty is expressed as a covariance matrix, and that matrix is diagonal, then the "R" matrix remains diagonal with the following form:

$$R = \text{diag}[(\sigma PR1^2 \ \sigma PR2^2 \ldots \sigma PRm^2 \ \sigma_e^2 \ \sigma_n^2)] \quad (5)$$

In Equation (5), "$\sigma^2 PR$" denotes an error variance assigned to the linearized pseudo range measurement(s), and "$(\sigma_e^2$" and "$\sigma_n^2$" denote the error variances assigned to the East and North components of the position correction constraints, respectively. These error variances are derived from the corresponding diagonal elements of the covariance matrix for the coarse location estimate., The "R" matrix given in Equation (5) assumes that there are a total of "m" linearized pseudo range measurements.

The elements of the "H" matrix corresponding to the constraint Equations (3) and (4) become:

$$h_e^T = [1 0 0 0] \quad (6)$$

$$h_n^T = [0 1 0 0] \quad (7)$$

In Equations (6) and (7), the "e" and "n" subscripts correspond to the East and North position corrections, respectively.

The effect of the position constraint equations upon the position solution can be better understood by reference to the exemplary WLS position solution process of FIG. 3. At block 320, the "H" and "R" matrices include at least two additional measurements as explained in the text and equations above for independent position component constraints. The pseudo-inverse matrix "H" is also dependent upon the "H" and "R". The position constraints limit the magnitude of the computed correction vector according to the assumed accuracy or uncertainty of the coarse location. For example, if the coarse location is accurate to 1 km, it will be unlikely that the correction vector will exceed 3 km (corresponding to a "three-sigma" condition, so it is less than 1% probable under the assumption of a Gaussian distribution). Considering the convergence of the iterative algorithm to a final position graphically, the constraints operate like a restoring force on the position movement from its initial location, i.e., the coarse location. Without the position constraints, the correction vector magnitude is not limited and may converge anywhere, for example, the final solution may move tens (or even hundreds) of kilometers from the initial coarse location. Position solutions including, for example, Least Squares (LS) position solutions, among others, may also be constrained according to the disclosure.

More generally, Equations (3) and (4) cannot be expressed in independent form. For example, it is unlikely that the covariance matrix associated with the coarse location estimate will be diagonal where the coarse position estimate is derived from an E-OTD or a TDOA location fix, since independence would require a specific base station geometry, for example, that the base stations all be located directly East or North of the handset location.

Where the covariance matrix is not diagonal, which indicates that the measurement errors are not independent, error ellipse information is preferred. If error ellipse information cannot not supplied directly, error ellipse information may be computed from the covariance matrix by a transformation, i.e., a rotation in the horizontal plane, which produces a diagonal covariance matrix in the rotated coordinates. This transformation can be completely described by the rotation angle, $\theta$, used in Equations (8) and (9) below:

$$\cos\theta \delta p_e + \sin\theta \delta p_n = 0 \quad (8)$$

$$\cos\theta \delta p_n - \sin\theta \delta p_e = 0 \quad (9)$$

Figure 5:
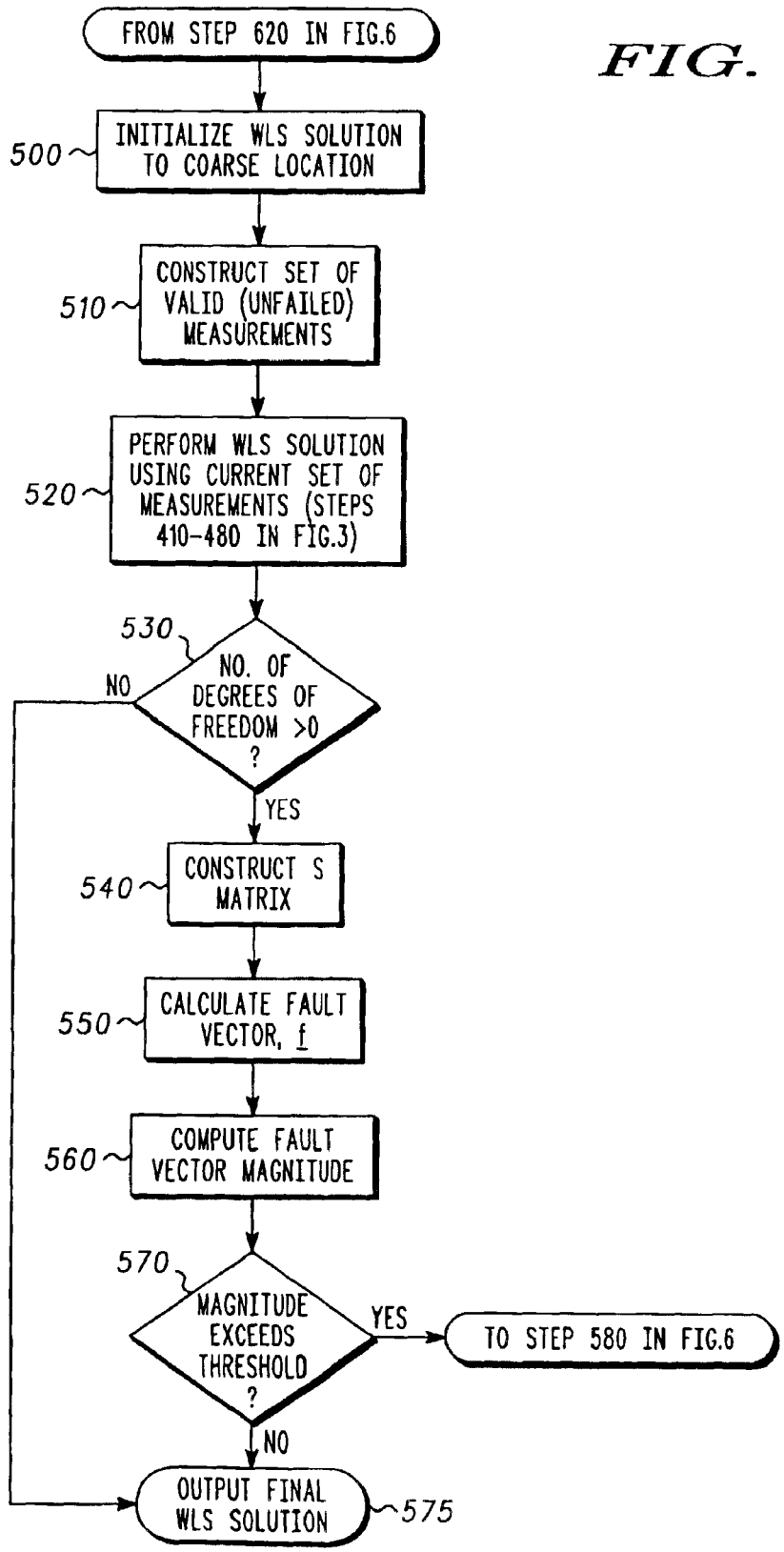
FIG. 5 is an exemplary process flow diagram illustrating the use of a Weighted Least Squares position solution in isolating erroneous measurements.

In Equations (8) and (9), the angle "$\theta$" represents the orientation angle of an ellipse in the horizontal plane illustrated in FIG. 5. "$\theta$" denotes rotation from the East coordinate to the semi-major axis of the ellipse, "a" denotes the length of the semi-major axis, and "b" demotes the length of the semi-minor axis. The error variances assigned to each constraint equation above correspond to magnitudes of the principal axes of the error ellipse. The advantage of the error ellipse is that, in the coordinates of the ellipse, i.e., its semi-minor and semi-major axes, the constraint errors are independent, which provides the basis for determining the angle "$\theta$" defining the ellipse orientation relative to a reference direction. Equations (8) and (9) can be written more compactly using vector-matrix notation as follows:

$$C(\theta)\delta p = 0 \quad (10)$$

Where "C" is a (2×2) rotation matrix, which mechanizes the required transformation:

$$C(\theta) = \begin{vmatrix} \cos(\theta) & \sin(\theta) \\ -\sin(\theta) & \cos(\theta) \end{vmatrix} \quad (11)$$

More generally, the elements of the "H" matrix corresponding to the position constraint equations become:

$$h_e^T = [\cos(\theta) \ \sin(\theta) \ 0 \ 0] \quad (12)$$

$$h_n^T = [-\sin(\theta) \ \cos(\theta) \ 0 \ 0] \quad (13)$$

The corresponding "R" matrix elements are given by the diagonal elements of the transformed covariance matrix "P" as follows:

$$R_2 = C(\theta) P C(\theta)^T \quad (14)$$

In Equation (14), "P" is the non-diagonal covariance matrix and "C" produces the components of the "$R_2$" matrix corresponding to the constraint equations. As stated above, because the error ellipse representation produces the angle "$\phi$", which makes the constraint error components, i.e., the errors associated with Equations (8) and (9) independent, "$R_2$" is a diagonal matrix. The diagonal form of the "R" matrix is preserved by transforming the measurement equations (and so the "H" matrix elements) using the ellipse orientation angle $\theta$.

Constraining GPS position computations using E-OTD or other estimated location uncertainty information in the position domain is readily implemented using existing messaging capabilities, for example, the GSM messaging protocol. Additionally, the constraint is performed using methods that minimize the computational burden on the Weighted Least Squares (WLS) and other iterative position solution algorithm. This disclosure thus describes a computationally efficient method for constraining GPS solutions with estimated position uncertainty information that avoids burdensome calculations.

According to a related aspect of the disclosure, the position solution algorithm may also use a time constraint based on time uncertainty information alone or in combination with the position constraints discussed above. One or more pseudo range measurements used in the iterative solution may thus be augmented by the following time correction constraint:

$$\delta t = 0 \quad (15)$$

In Equation (15), "$\delta t$" is the time correction constraint component, which constrains the magnitude of the time correction in the iterative position solution, subject to the accuracy or uncertainty of the time estimate. If the time estimate uncertainty is independent of the position uncertainties, then the "R" matrix remains diagonal with the following form:

$$R = \text{diag}[\sigma PR1^2 \; \sigma PR2^2 \ldots \sigma PRm^2 \sigma_t^2] \quad (16)$$

In Equation (16), "$\sigma_t^2$" denotes the error variance assigned to the time correction constraint. The "R" matrix of Equation (16) assumes that there are a total of "m" linearized pseudo range measurements. More generally, Equation (16) may also include the position correction constraint component uncertainties "$\sigma_e^2$", ", $\sigma_n^2$" discussed above.

The elements of the "H" matrix corresponding to the constraint Equations (15) become:

$$h_t^T = [0 0 0 1] \quad (17)$$

In Equation (17), the first two elements correspond to the horizontal position corrections discussed above, the third term corresponds to altitude correction, and the fourth term corresponds to the time correction. Equation (17) can be used when the error of the local oscillator relative to GPS time can be bounded. For example, the time error information may be obtained from a prior GPS position fix, with the time since the last fix maintained by the local oscillator within the GPS receiver. The assumption that the time error constraint equation is independent of the position error (permitting use of the diagonal R matrix in Equation (16), is not always valid. Generally, the validity of the assumption depends upon the time that has elapsed since the prior position fix computation. As the time between location computations increases, the assumption becomes valid, since the error induced by drift of the local oscillator over the time between position fixes dominates the previous fix error.

Generally, the effect of the drift in the local oscillator over the elapsed time between fixes must be included in the variance assigned to the time constraint, i.e., "$\sigma_t^2$" in Equation (16). Alternatively, the time error information may be communicated to the satellite positioning system receiver over a cellular communications network, in which case the latency of the message(s) delivering information must be considered in the variance assigned to the time constraint.

In one embodiment, the time and/or position uncertainty constraints discussed above may be used in the iterative algorithm, for example, the WLS computation discussed above, to increase the accuracy of a position solution, for example, by augmenting two or more pseudorange measurements with location uncertainty constraints, and/or with a time uncertainty constraint. Thus in the process of FIG. 2, estimated time and time uncertainty is obtained at block 210, and the position solution is constrained with the time and/or position uncertainty information at block 240. The constrained position and/or time solutions may be computed at the satellite positioning system receiver or at some other location, for example, at a location server in a cellular communications network with receipt of pseudo range information from a satellite positioning system enabled wireless communications device.

In other embodiments, the use of uncertainty constraints permits the computation of position solution information other than position per se. In one embodiment, for example, an iterative algorithm may be used to compute time error, e.g., the local oscillator offset in the satellite positioning system receiver, using a single pseudo range measurement, coarse altitude information, and coarse location uncertainty constraints. If two pseudo range measurements are available, corrections along a line-of-sight direction of one of the satellites, for example, the satellite having the lowest elevation, may be computed.

The use of uncertainty constraints with residual information of an over-determined LS or WLS solution permits the isolation of erroneous pseudo range measurements and the detection of failed signal sources, for example, failed satellites, which is a rare occurrence. Erroneous pseudo range measurements may be the result of false signal detections, the likelihood of which increases as the thresholds for signal acquisition are reduced in certain environments, including, for example, the detection of GPS signals within buildings, urban canyons, etc. The use of residual information in isolating faulty measurements is known generally in the art.

The Failure Detection, Isolation, and Correction (FDIC) process applied to an over-determined set of equations (i.e., a set of equations for which there are more independent equations than unknowns) is illustrated in the flowchart appearing as FIG. 5. The process includes at least some of the steps of the exemplary WLS algorithm depicted in FIG. 3. In FIG. 5, at block 500, for example, a WLS solution is initialized at the coarse location, as discussed generally above.

In FIG. 5, at block 510, a measurement that is expected to be erroneous, for example, a GPS pseudo range measurement, a position or time measurement, etc., is removed. Particularly, any measurement that has been previously identified as suspect is excluded from the current set of measurements to be utilized in the iterative algorithm. Generally, when a suspected faulty measurement is eliminated from the iterative solution computation, several iterations having different sets of measurements may be required to verify whether the removed measurement is truly faulty or erroneous.

The iterative steps associated with the WLS solution itself, for example, those corresponding to steps 310–380 in FIG. 3, are included at block 520 in FIG. 5. The iterative algorithm at block 520 is performed on the measurement set excluding the measurement removed at block 510. At block 530, a test is made on the number of degrees of freedom, i.e., the number of measurements minus the number of unknowns. If the degree of freedom is zero or less, failure detection and isolation is not possible and the position solution is output at block 575.

In FIG. 5, at block 530, if at least one failure detection is possible, the "S" matrix and "fault vector", 'f', are formed at blocks 540 and 550, as indicated in Equations (18) and (19) below:

$$f = S R^{-1/2} r \quad (18)$$

$$\text{where: } S = I - R^{-1/2} H (H^T R^{-1} H)^{-1} H^T R^{-1/2} \quad (19)$$

The notation used in Equations (18) and (19) is consistent with that used in the equations for the "H", "R" and "r" matrices defined above. Equations (18) and (19) may be augmented, as before, with position and/or time constraint equations. The matrix denoted "I" in Equation (19) denotes the identity matrix, i.e., a diagonal matrix with unity values for diagonal elements.

The fault vector "f" in Equation (17) has the same dimension as r, the vector of linearized pseudo range measurements augmented by the position constraints and/or time constraints. Thus, each component of "f" corresponds to an individual measurement, one-to-one. The magnitude of the fault vector is determined at block 560. Generally, the magnitude of the fault vector, when excessive, is indicative of one or more measurement failures. Because of the weighting introduced by "$R^{-1/2}$" in Equation (18), the fault vector is "normalized" by the measurement uncertainty level (i.e., the corresponding element in the R matrix). This normalization enables use of standard statistical tables for "Chi-square" statistics for setting an appropriate threshold for the magnitude of "f" which leads to a declaration of one or more "faulty" measurements. This threshold comparison is performed at block 570. Generally, the threshold is set as a function of the number of degrees of freedom to correspond to an acceptable rate of false alarming, i.e., declaring that a failure is present when all measurements are not erroneous. If the threshold is not exceeded, the final WLS solution can be output at block 575.

Figure 6:
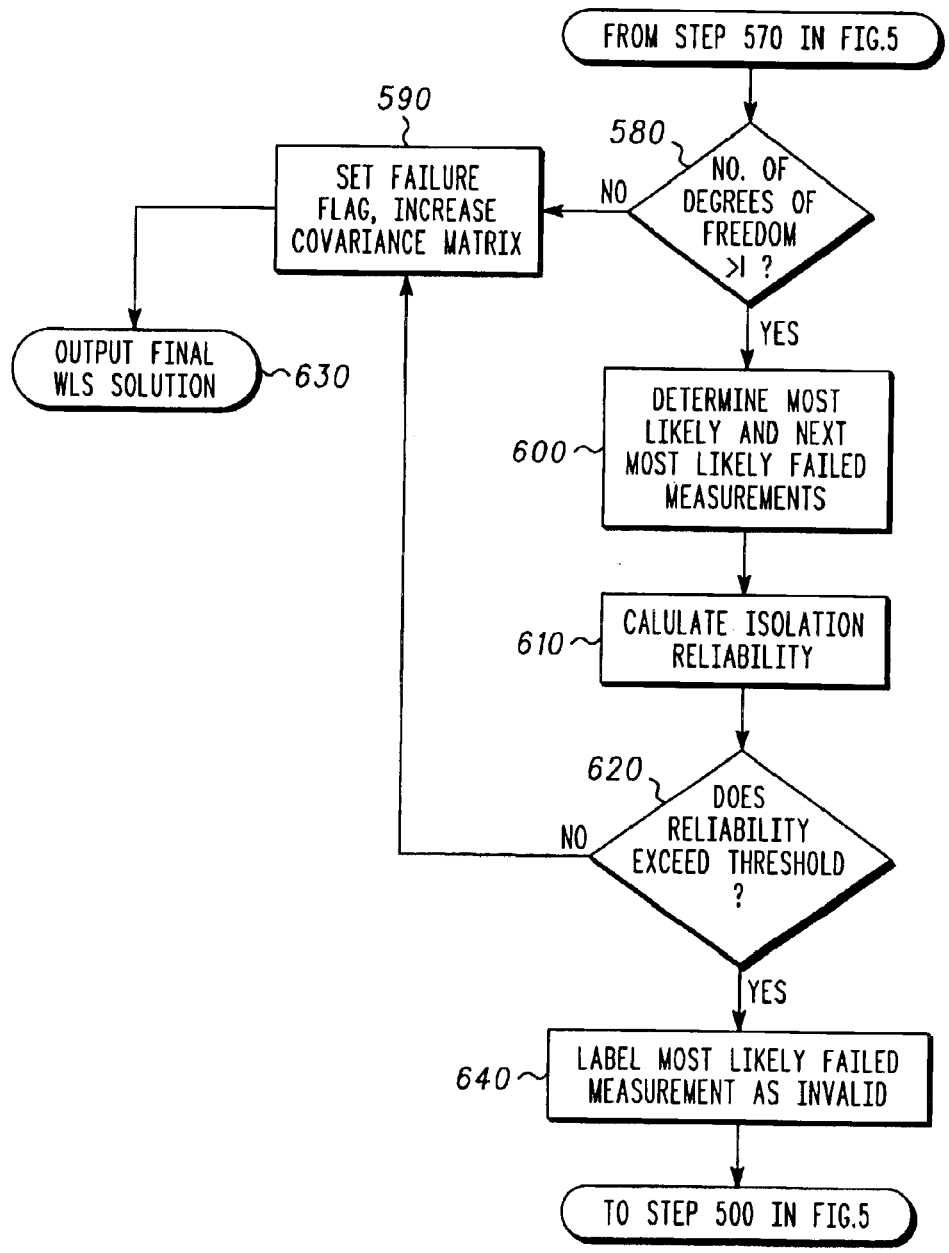
FIG. 6 is an exemplary process flow diagram illustrating the use of a Weighted Least Squares position solution in isolating erroneous measurements.

In FIG. 5, if a failure is detected at block 570, a second test is performed on the number of degrees of freedom to determine if isolation is possible at block 580 in FIG. 6. If isolation is not possible, the WLS process terminates with a failed position solution in one embodiment, the failed position solution is flagged as unreliable at block 590, and the covariance matrix or solution accuracy measure is increased.

The failed position solution is output at block 630. Failure isolation is performed, starting at block 600, by selecting the most-likely and next most likely failed measurements. In one embodiment, the measurements with the largest and next largest values for ($f_i^2/S_{ii}$) for the $i^{th}$ measurement are selected as the most-likely and next most likely failed measurements, respectively. Although use of the fault vector magnitude in failure detection is reliable, failure isolation is not necessarily reliable and so should be followed by a reliability test, as indicated at blocks 610 and 620, before a measurement is removed from the position solution. The isolation reliability can be assessed by comparing an isolation statistic, i.e., $f_i^2/S_{ii}$, for the most likely and next most likely failed measurements, and comparing this with an appropriate threshold, as illustrated at block 620. If the threshold is not exceeded, the isolation is not reliable, and so the measurement cannot be excluded from the solution, since removal would likely result is a worse solution. In this case, the faulty position solution is output through step 590, with an indication that a failed measurement is present which cannot be isolated, with a corresponding increase in the error variance assigned to the solution, as discussed above. If the isolation is reliable, the most likely failed measurement is labeled as invalid at block 640, and the process returns to block 500 in FIG. 5. The process of FIGS. 5 and 6 can continue until no additional failures may be determined or isolated or until no additional degrees of freedom remain, i.e., the set of measurements is no longer over-determined.

Augmenting the navigation solution with position and/or time constraints discussed above will generally strengthen the ability to isolate faulty pseudo range measurements. The additional measurements implied by the constraint equations increase the "degrees of freedom" (i.e., the level of redundancy in the measurement set). The benefits to faulty measurement isolation are a function of the accuracy of the coarse position relative to the magnitude of the pseudo range measurement fault, e.g., a coarse position accurate to 1 km should readily enable isolation of faults 5–10 km in magnitude.

Although the addition of the position constraints will generally improve the ability to isolate faulty pseudo range or other measurements, the introduction of a faulty constraint may sometimes lead to a new set of issues for FDIC. For the case when the FDIC algorithm isolates either position constraint, i.e., either component of the location, for example, the supplied latitude or longitude, as faulty, and this isolation passes the reliability test, the constraint itself should be removed and an unconstrained solution should be attempted. This situation will most likely occur when the uncertainty information supplied with the time or position constraint is incorrect, e.g., the coarse latitude is in error by 10 km, but the uncertainty provided indicates an accuracy of 1 km.

Coarse location and/or timing information and corresponding uncertainty information may also be used to more accurately determine time directly from satellites of a satellite positioning system, for example, from GPS satellites, and to determine time by acquiring fewer satellites, for example, less than four satellites. Exemplary schemes for obtaining time directly from satellites of a satellite positioning system that would benefit from the present disclosure include that of U.S. Pat. Publication No. 20030187575A1, U.S. application Ser. No. 10/108,409, entitled "Time Determination In Satellite Positioning System Receivers And Methods Thereof". According to this aspect of the disclosure, the position constraints themselves do not directly constrain the time computation, but when taken together with the linearized pseudo range measurements, the position constraints enable a more accurate and robust solution for both position and time. Since position and time error are related through the linearized pseudo range measurements, strengthening position information will also improve the time solution. In cellular communications applications, time estimate and/or constraint information may be communicated through the cellular infrastructure, or alternatively it may be determined from knowledge of periodic events within the GPS data message, as discussed in the referenced U.S. Pat. Publication No. 20030187575A1 corresponding to U.S. application Ser. No. 10/108,409.

The coarse location, when introduced as a position constraint as defined by Equations (3) through (7), or Equations (10)–(14) if error ellipse information is available, can also be used to strengthen the ability to estimate GPS time using an over-determined solution (e.g., 5 satellites to solve for three clock correction, a user clock error correction, and a correction to the initial assumed GPS time) using an iterative location computation algorithm. The position and/or time constraints disclosed in the present application, for examples, can reduce the number of satellites required to compute the over-determined time/position solution in the referenced U.S. Pat. Publication No. 20030187575A1 corresponding to U.S. application Ser. No. 10/108,409. In addition, accuracy will generally be improved when more satellites are available. The use of a time constraint will similarly benefit the availability and accuracy of the time solution. Here, the time error constrained is the error in knowledge of GPS time (the additional unknown in the time determination solution). Equation (17) is replaced by Equation (20) below, where the fifth unknown corresponds to the error in knowledge of GPS time. The other four unknowns remain the same as for the position solution when GPS time is known.

$$h_t^T = [0\ 0\ 0\ 0\ 1] \tag{20}$$

The error in GPS time is observed through the motion of the GPS satellites, so the error is related to the linearized pseudorange measurements through the following equation, which is a counterpart of Equation (2) for the position solution when GPS time is known:

$$h^T = [u^T 1 \; Rdot] \quad (21)$$

In Equation (21), Rdot is the range rate to the satellite whose linearized pseudo range is represented by Equation (21). Equations (21) and (22) may be used in a WLS or other iterative solution to determine position and satellite positioning system time.

While the present disclosure and what are considered presently the best modes of the inventions have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method for locating a satellite positioning system receiver, the method comprising:

obtaining at least one satellite pseudo range measurement;

determining a position solution for the satellite positioning system receiver using the at least one pseudo range measurement;

constraining the position solution determination with an uncertainty constraint associated with uncertainty of information used to determine the position solution of the satellite positioning system receiver.

2. The method of claim 1, determining the position solution for the satellite positioning system receiver using a coarse location estimate of the satellite positioning system receiver;

constraining the position solution determination with an uncertainty constraint associated with uncertainty of the coarse location estimate of the satellite positioning system receiver.

3. The method of claim 2, the uncertainty of the coarse location estimate of the satellite positioning system receiver is an uncertainty ellipse, constraining the position solution determination by the uncertainty ellipse of the coarse location estimate.

4. The method of claim 3, transforming the uncertainty ellipse and the coarse location estimate into position solution coordinates, determining the position solution after transforming.

5. The method of claim 2, the satellite position system receiver is a wireless communications device, receiving the coarse location and uncertainty information from a communications network, determining the position solution on the wireless communications device.

6. The method of claim 2, linearizing the at least one pseudo range measurement based upon the course location estimate;

determining the constrained position solution using the at least one linearized pseudo range measurement and the coarse location estimate.

7. The method of claim 1, determining the position solution for the satellite positioning system receiver using a time estimate, constraining the position solution determination with an uncertainty constraint associated with uncertainty of the time estimate.

8. A method in mobile wireless communications device, the method comprising:

computing position solution information for the mobile wireless communications device;

constraining the position solution information computation with an uncertainty constraint based upon uncertainty information associated with information used to compute the position solution information.

9. The method of claim 8, computing the position solution information for the satellite positioning system receiver using coarse position estimate information, constraining the position solution computation with a coarse position uncertainty constraint.

10. The method of claim 8, the satellite positioning system receiver is a wireless communications device, obtaining the uncertainty information from a communications network, constraining the position solution computation with the uncertainty information from the communications network.

11. The method of claim 8, computing the position solution information for the satellite positioning system receiver using time estimate information, constraining the position solution computation with a time estimate uncertainty constraint.

12. A method for computing the location of a satellite positioning system receiver, the method comprising:

determining an over-determined position solution using information including at least one of coarse position and coarse time information;

evaluating the information used to compute the over-determined position solution using residual information from the over-determined position solution and using uncertainty information for the at least one of the coarse location estimate and coarse time estimate used to compute the over-determined position solution.

13. The method of claim 12, determining the over-determined position solution using pseudo range information, evaluating the information used to compute the over-determined position solution includes evaluating the pseudo range information, removing any erroneous pseudo range measurement from a position solution of the satellite positioning system receiver upon evaluating the pseudo range measurements.

14. The method of claim 12, removing erroneous information used to determine the position solution from a subsequent position solution of the satellite positioning system receiver upon evaluating the information.

15. A method in a satellite positioning system receiver, the method comprising:

determining a satellite positioning system time solution for the satellite positioning system receiver;

constraining the satellite positioning system time solution determination with an uncertainty constraint associated with uncertainty of information used to determine the satellite positioning system time solution.

16. The method of claim 15,
determining the satellite positioning system time solution using coarse time information,
constraining time solution with time uncertainty information associated with the coarse time information.

17. The method of claim 15,
determining a satellite positioning system position solution when determining the satellite positioning system time solution using coarse position information,
constraining the time and position solutions with position uncertainty information associated with the coarse position information.

18. The method of claim 15,
obtaining at least one satellite pseudo range measurement;
determining the satellite positioning system time solution using the at least one pseudo range measurement in addition to a coarse location estimate of the satellite positioning system receiver,
constraining the satellite positioning system time solution by an uncertainty of the coarse location estimate of the satellite positioning system receiver.

* * * * *